US012627346B2

(12) United States Patent
Hajri et al.

(10) Patent No.: US 12,627,346 B2
(45) Date of Patent: May 12, 2026

(54) CSI TRIGGERING AND CONFIGURATION ENHANCEMENTS FOR PARTIAL-RECIPROCITY BASED PORT SELECTION CODEBOOK

(71) Applicant: Nokia Technologies Oy, Espoo (FI)

(72) Inventors: Salah Eddine Hajri, Antony (FR);
Frederick Vook, Schaumburg, IL (US);
Rana Ahmed Salem, Munich (DE);
Eugene Visotsky, Buffalo Grove, IL
(US); William Hillery, Lafayette, IN
(US); Filippo Tosato, Bures sur Yvette
(FR)

(73) Assignee: Nokia Technologies Oy, Espoo (FI)

( * ) Notice: Subject to any disclaimer, the term of this
patent is extended or adjusted under 35
U.S.C. 154(b) by 516 days.

(21) Appl. No.: 18/019,840

(22) PCT Filed: Aug. 7, 2020

(86) PCT No.: PCT/EP2020/072258
§ 371 (c)(1),
(2) Date: Feb. 6, 2023

(87) PCT Pub. No.: WO2022/028713
PCT Pub. Date: Feb. 10, 2022

(65) Prior Publication Data
US 2023/0283341 A1 Sep. 7, 2023

(51) Int. Cl.
*H04B 7/06* (2006.01)
*H04L 5/00* (2006.01)
*H04W 72/23* (2023.01)

(52) U.S. Cl.
CPC ......... *H04B 7/0626* (2013.01); *H04B 7/0639*
(2013.01); *H04L 5/0048* (2013.01); *H04W*
*72/23* (2023.01)

(58) Field of Classification Search
CPC .. H04B 7/0626; H04B 7/0639; H04B 7/0456;
H04L 5/0048; H04L 5/0023;
(Continued)

(56) References Cited

U.S. PATENT DOCUMENTS

2018/0167117 A1\* 6/2018 Liu ........................... H04B 7/06
2018/0294849 A1\* 10/2018 Chen ..................... H04B 7/0639
(Continued)

FOREIGN PATENT DOCUMENTS

WO WO 2020/061952 A1 4/2020
WO WO-2020073644 A1 \* 4/2020 ......... G01S 5/02213

OTHER PUBLICATIONS

ZTE, "On reciprocity based CSI acquisition," 3GPP TSG RAN
WG1 NR AdHoc#2, R1-1710189, Qingdao, China, Jun. 27-30,
2017.
(Continued)

*Primary Examiner* — Hassan A Phillips
*Assistant Examiner* — Muhammad Ainul Huda
(74) *Attorney, Agent, or Firm* — Lippes Mathias LLP

(57) ABSTRACT

A method, apparatus, and a computer-readable storage
medium are provided for partial reciprocity-based adaptive
port selection codebook configuration. A method, apparatus,
and a computer-readable storage medium are provided for
partial reciprocity-based adaptive port selection codebook
configuration. In an example implementation, the method
may include a user equipment receiving at least one channel
state information reporting configuration from a network
node, the at least one channel state information reporting
configuration including precoding matrix indicator as
reporting quantity and an adaptive port selection codebook
configuration for the precoding matrix indicator and deter-
mining whether partial reciprocity operations for adaptive
port selection precoding matrix indicator are activated, the (Continued)

determining based at least on information in a sounding reference signal (SRS) request field of a downlink control information, an active semi-persistent SRS, or a periodic SRS configured by higher layers.

19 Claims, 7 Drawing Sheets

(58) Field of Classification Search
CPC ... H04L 5/0057; H04L 5/0094; H04L 5/0051; H04W 72/23
See application file for complete search history.

(56) References Cited

U.S. PATENT DOCUMENTS

| | | | |
|---|---|---|---|
| 2019/0081678 A1 | | 3/2019 | Park et al. |
| 2019/0349964 A1* | | 11/2019 | Liou ..................... H04B 7/0626 |

| | | | | |
|---|---|---|---|---|
| 2020/0367217 A1* | 11/2020 | Wang | ..................... | H04L 5/0094 |
| 2021/0152293 A1* | 5/2021 | Hosseini | ............... | H04L 1/1854 |
| 2022/0078649 A1* | 3/2022 | Chen | ..................... | H04L 5/0057 |
| 2022/0123887 A1* | 4/2022 | Zander | ................. | H04B 7/0617 |
| 2023/0026606 A1* | 1/2023 | Yuan | ..................... | H04W 72/23 |
| 2023/0054488 A1* | 2/2023 | Manolakos | ........... | H04L 5/0035 |
| 2023/0131045 A1* | 4/2023 | Huang | ................. | H04B 7/0482 |
| | | | | 375/267 |
| 2023/0299914 A1* | 9/2023 | Lim | ..................... | H04B 7/0639 |
| | | | | 370/329 |

OTHER PUBLICATIONS

ZTE, "CSI Enhancement for MU-MIMO Support," 3GPP TSG RAN WG1 Meeting #95, R1-1813913, Spokane, USA, Nov. 12-16, 2018.

* cited by examiner

Example Wireless Network <u>130</u>

Figure 5:
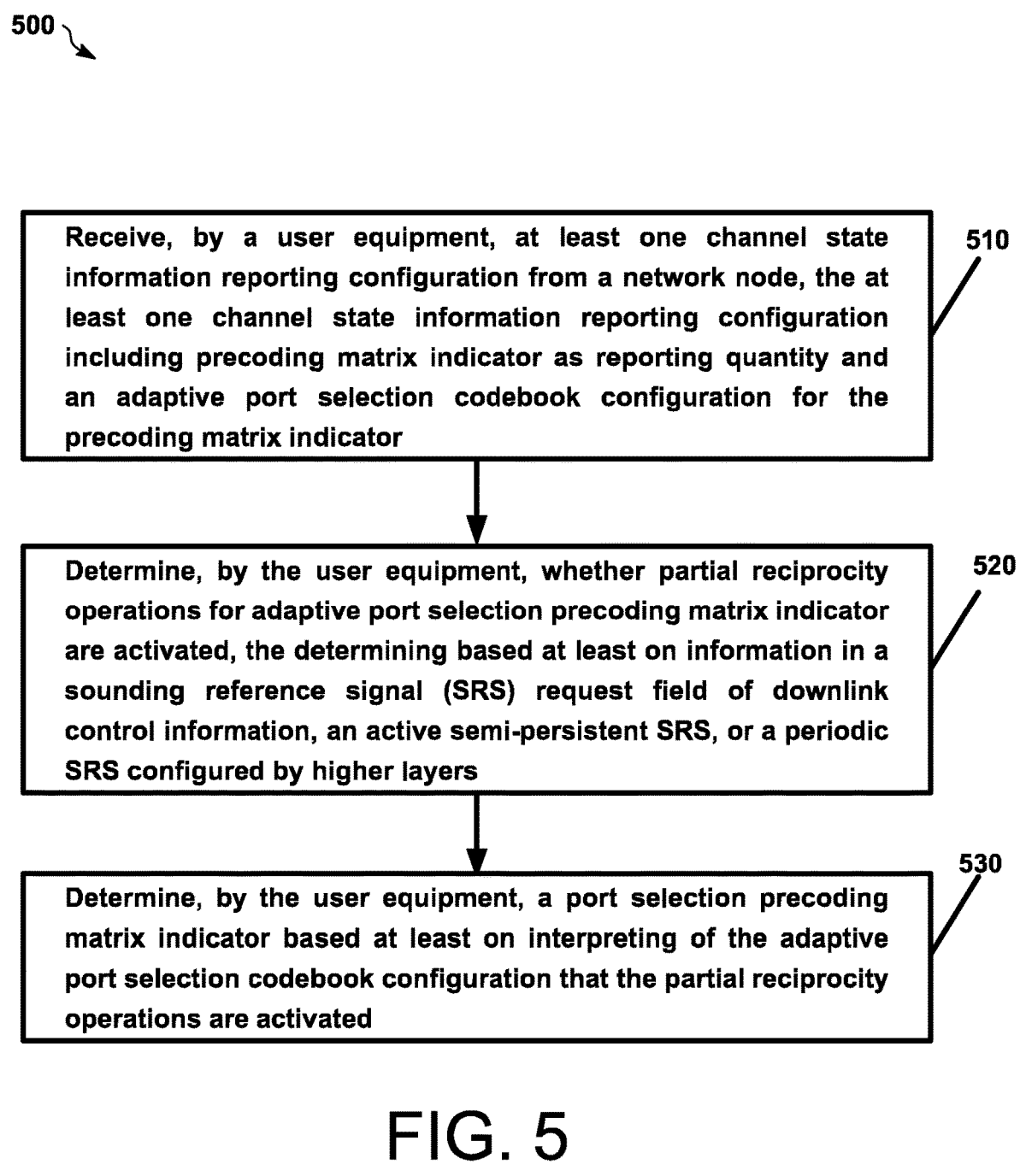

500

Receive, by a user equipment, at least one channel state information reporting configuration from a network node, the at least one channel state information reporting configuration including precoding matrix indicator as reporting quantity and an adaptive port selection codebook configuration for the precoding matrix indicator — 510

Determine, by the user equipment, whether partial reciprocity operations for adaptive port selection precoding matrix indicator are activated, the determining based at least on information in a sounding reference signal (SRS) request field of downlink control information, an active semi-persistent SRS, or a periodic SRS configured by higher layers — 520

Determine, by the user equipment, a port selection precoding matrix indicator based at least on interpreting of the adaptive port selection codebook configuration that the partial reciprocity operations are activated — 530

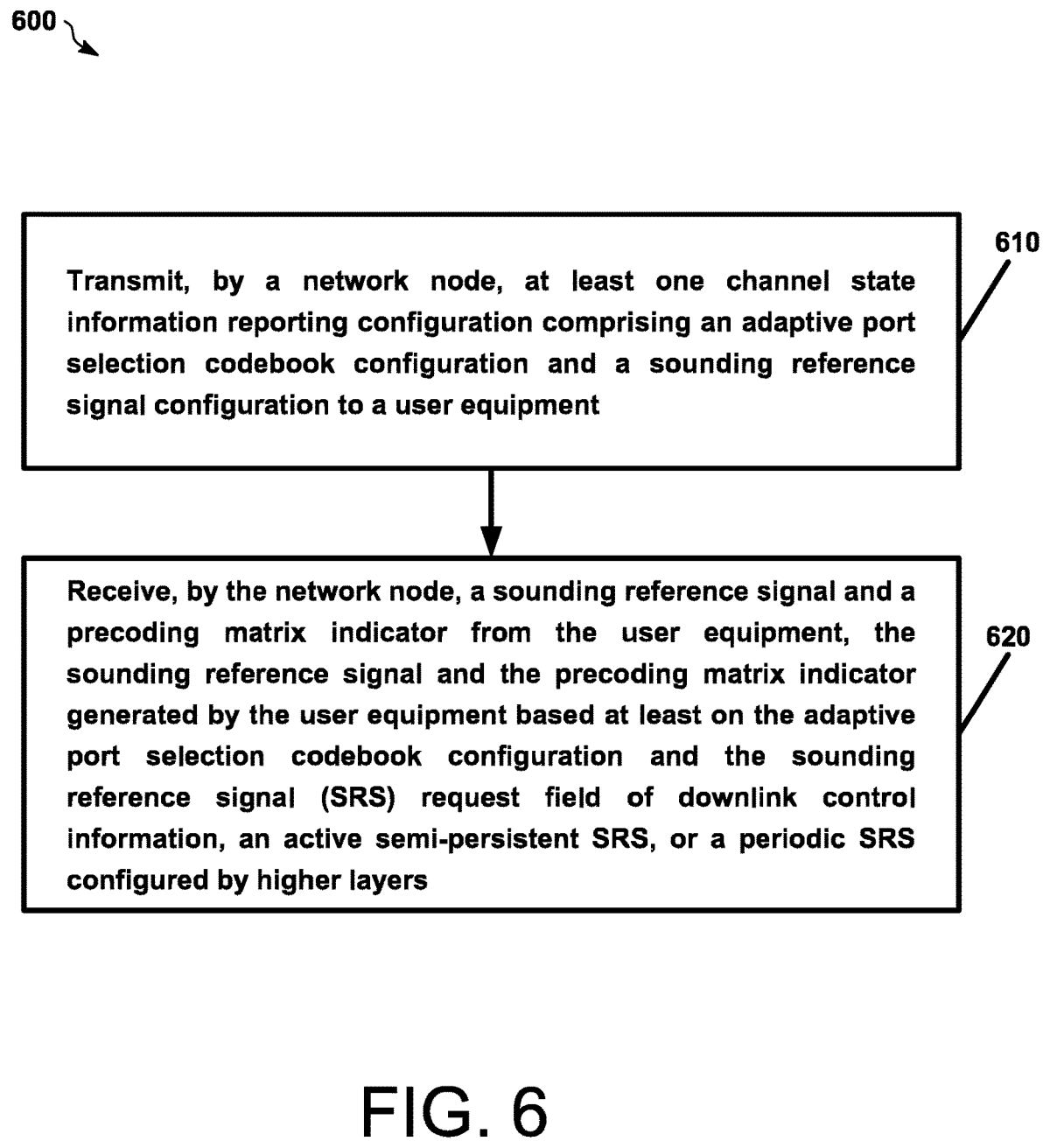

Transmit, by a network node, at least one channel state information reporting configuration comprising an adaptive port selection codebook configuration and a sounding reference signal configuration to a user equipment

620

Receive, by the network node, a sounding reference signal and a precoding matrix indicator from the user equipment, the sounding reference signal and the precoding matrix indicator generated by the user equipment based at least on the adaptive port selection codebook configuration and the sounding reference signal (SRS) request field of downlink control information, an active semi-persistent SRS, or a periodic SRS configured by higher layers

FIG. 6

CSI TRIGGERING AND CONFIGURATION ENHANCEMENTS FOR PARTIAL-RECIPROCITY BASED PORT SELECTION CODEBOOK

CROSS REFERENCE TO RELATED APPLICATION

This patent application is a U.S. National Stage application of International Patent Application Number PCT/EP2020/072258 filed Aug. 7, 2020, which is hereby incorporated by reference in its entirety.

TECHNICAL FIELD

This description relates to wireless communications, and in particular, port selection codebook.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra reliable low latency communications (URLLC) devices may require high reliability and very low latency.

SUMMARY

Various example implementations are described and/or illustrated. The details of one or more examples of implementations are set forth in the accompanying drawings and the description below. Other features will be apparent from the description and drawings, and from the claims.

A method, apparatus, and a computer-readable storage medium are provided for partial reciprocity-based adaptive port selection codebook configuration. In an example implementation, the method may include a user equipment receiving at least one channel state information reporting configuration from a network node, the at least one channel state information reporting configuration including precoding matrix indicator as reporting quantity and an adaptive port selection codebook configuration for the precoding matrix indicator and determining whether partial reciprocity operations for adaptive port selection precoding matrix indicator are activated, the determining based at least on information in a sounding reference signal (SRS) request field of a downlink control information, an active semi-persistent SRS, or a periodic SRS configured by higher layers. The method may further include determining, by the user equipment, a port selection precoding matrix indicator based at least on interpreting of the adaptive port selection codebook configuration that the partial reciprocity operations are activated.

In another example implementation, the method may include a network node transmitting at least one channel state information reporting configuration comprising an adaptive port selection codebook configuration and a sounding reference signal configuration to a user equipment and receiving a sounding reference signal and a precoding matrix indicator from the user equipment, the sounding reference signal and the precoding matrix indicator generated by the user equipment based at least on the adaptive port selection codebook configuration and the sounding reference signal (SRS) request field of downlink control information, an active semi-persistent SRS, or a periodic SRS configured by higher layers.

BRIEF DESCRIPTION OF THE DRAWINGS

FIG. 5 is a flow chart illustrating a partial reciprocity-based adaptive port selection codebook configuration, according to an example implementation.

FIG. 6 is a flow chart illustrating a partial reciprocity-based adaptive port selection codebook configuration, according to an additional example implementation.

DETAILED DESCRIPTION

Figure 1:
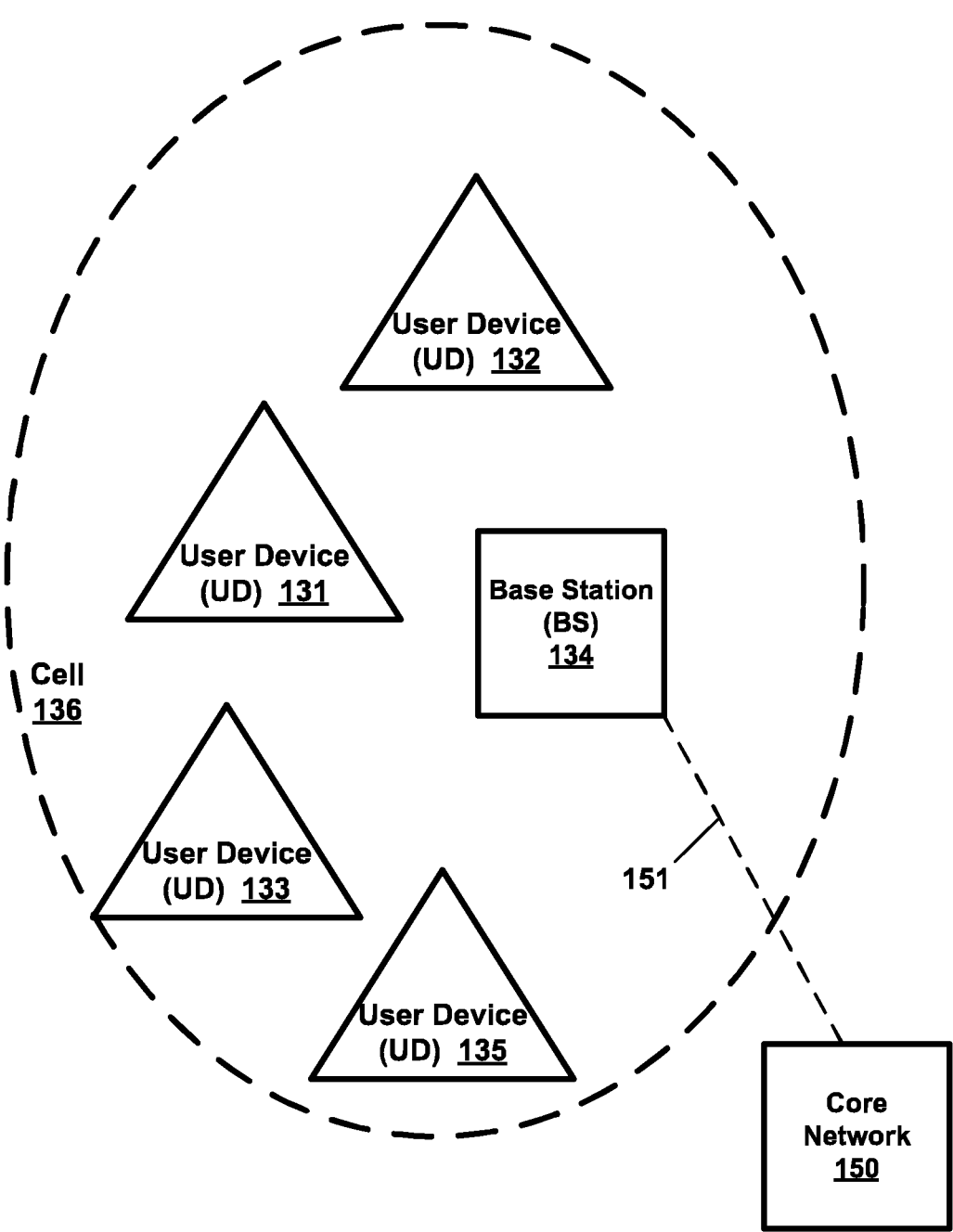
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a next-generation Node B (gNB) or a network node. At least part of the functionalities of an access point (AP), base station (BS), (e) Node B (eNB), or gNB may also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to an eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs) (e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a channel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

In 5G NR, a UE, can be configured to carry out different measurements and report them to the network. The channel state information (CSI) report is configured in radio resource control (RRC) and indicates a quantity or set of quantities that the UE is supposed to report. The report could, for example, include different combinations of the following: channel quality indicator (CQI), rank indicator (RI), precoding matrix indicator (PMI), CSI-RS resource indicator (CRI), SS/PBCH block resource indicator (SSBRI), layer indicator (LI), L1-RSRP, L1-SINR, etc.

The CSI reporting can be periodic, semipersistent, or aperiodic. According to 3GPP Specification 38.214, Table 5.2.1.4-1, aperiodic CSI reporting can be triggered (e.g., explicitly) via downlink control information (DCI) using, for example, a CSI-request field of the DCI. The CSI-request field in the DCI indicates an aperiodic CSI trigger state from a list of configured trigger states.

Rel-17 work on CSI enhancements for 5G new radio (NR) SRS will consider improving type II port selection based on downlink/uplink partial reciprocity. The latter refers to DL/UL reciprocity of angle(s) and delay(s) of the wireless channel, even with frequency division duplexing.

However, the proper design of partial reciprocity-based CSI process entails dealing with several aspects including uplink control signalling format (e.g., UCI design in NR), timely triggering of uplink reference signal to obtain reciprocal wideband channel information and beamformed reference signal transmission, reliability of UL RS based reciprocal information estimation, efficient configuration of reciprocity-based CSI reporting in RRC (e.g., reference signals configuration, trigger states, etc.).

In addition, the CSI reports for different component carriers (CCs) or bandwidth parts (BWPs) have to be configured in different trigger states. Therefore, the UE has to be configured with numerous trigger states to allow triggering CSI in different CCs/BWPs. For UEs with limited capabilities, it is not possible to configure large numbers of trigger states for multiple CCs/BWPs. In this context, reciprocity-based CSI reporting, which will be a focus in Rel-17, may further increase the demand for CSI trigger states, as new PMI codebook configuration, UE and gNB procedures are expected.

It would be beneficial to the gNB to retain the ability to trigger full port selection CSI feedback without reciprocity considerations. While estimating the strongest channel beam directions based on long-term reciprocity in FDD is feasible, especially in scenarios with low duplexing distance, estimating weaker beam direction can be more problematic and more error prone. Additionally, the aperiodic SRS request filed in downlink control information (e.g., SRS in 5G NR) may be limited to three possible aperiodic SRS-Resource-Triggers (e.g., in Rel-15 and Rel-16). This highlights the need for basing reciprocal wideband information for partial reciprocity-based port selection on suitable UL RS signals. In addition, incorporating reciprocity-based CSI operations requires an update to the CSI reporting configuration in RRC to take into consideration both the uplink and downlink reference signal resources (e.g., SRS, CSI-RS, SSB) and their associated properties.

The present disclosure addresses problems related to reciprocity-based CSI reporting triggering and configuration, for example, handling of CSI triggering while avoiding high demand on trigger states. The present disclosure describes an efficient and flexible aperiodic and semi-persistent CSI triggering and configuration framework for reliable partial reciprocity-based CSI reporting without impacting other UL RS based procedures (e.g. UL beam management).

In an example implementation, to enable reciprocity-based CSI operations, the gNB estimates reciprocal channel parameters for FDD uplink and downlink channels from SRS transmission (e.g., SRS in NR). This would provide the spatial and frequency domain supports for the channel (e.g., taps location, azimuth and elevation angles of arrival/departure, etc) and the gNB can proceed to beamform downlink reference signal transmissions (e.g., CSI-RS, SSS, etc.). The UE may be required to feedback limited PMI information. In some implementations, for example, only the frequency selective information in uplink CSI reporting (e.g., linear combination coefficients) may be reported. Alternately, partial wide-band information may also be reported, for example, via uplink control information (UCI). Thus, the above described approaches may enable a reduction in the total payload of CSI reporting, which would benefit the network as the strain on uplink resources is reduced, in addition to reduction in PMI computation complexity at the UE.

In addition, the present disclosure addresses the issue of reciprocity-based CSI triggering and configuration, taking into consideration SRSs limitations. The proposed approaches enable aperiodic/semi-persistent CSI report triggering, with configured port selection PMI, with and without partial reciprocity-based operation, while avoiding a prohibitive increase in the number of trigger states for aperiodic and semi-persistent CSI reports. Further, the proposed approaches provide a simple partial reciprocity-based CSI reporting configuration with minimal impact on RRC. Furthermore, the proposed invention enables to avoid any ambiguity between the UE and gNB when it comes to the timing/configuration of SRS transmission, beamformed downlink reference signal transmission and CSI reporting, which may occur if the gNB triggers partial reciprocity-based port selection and SRS transmission for ends other than port selection (e.g. UL beam refinement), which cannot be relied on for partial reciprocity based operations (limited number of ports/frequency domain density, power level, etc.).

The proposed solution includes at least the following: i) a novel adaptive port-selection codebook configuration which may include fields relating to partial-reciprocity based PMI reporting, ii) associating at least one CSI trigger state with at least one CSI reporting configuration that includes an adaptive port selection codebook configuration, iii) a novel field pointing to associated-SRS resource set IDs or SRS triggers, referred to hereafter as "associated-SRS." This field may point to several SRS resource sets or SRS trigger codepoints that may be used for partial reciprocity operations (e.g., depending on the number of ports, density in the frequency domain, power level, etc.).

In case of aperiodic CSI reporting and aperiodic SRS transmission, upon reception of an SRS and CSI request fields in the same or two different uplink scheduling DCIs, received within a given time offset, if the indicated CSI request field is associated with at least one CSI reporting configuration that specifies an adaptive port selection codebook configuration, the UE may select the proper behavior based on the SRS request filed. If the SRS request triggers an aperiodic SRS with SRS resource set IDs/SRS trigger included in the associated-SRS, then partial-reciprocity port selection is assumed, and UE adapts the corresponding CSI reporting behavior. If the SRS request triggers aperiodic SRS with SRS resource set IDs/SRS trigger not included in associated-SRS, then Rel-15/Rel-16 port selection is assumed without partial reciprocity-based operations.

In addition, the gNB may activate or deactivate partial reciprocity-based PMI reporting via dynamic downlink signaling (e.g. MAC-CE) or via configuration. In case partial reciprocity is deactivated, UE behavior for port selection PMI reporting will be independent from SRS and partial reciprocity will not be considered.

Furthermore, the above described procedures may be extended to include configurations where the UE is configured to transmit periodic or semi-persistent SRS. In such a configuration, the presence of the CSI request field in DCI (e.g., with a value other than 0) together with the scheduled transmission of SRS from the UE within the same frame may be interpreted by the UE as a trigger to feedback only a partial CSI feedback report where the gNB is expected to exploit the partial reciprocity.

It should be noted that SRS is just an example uplink reference signal, and not a limitation, for operations described in the present disclosure and other reference signals, e.g., a phase tracking reference signal (PTRS), etc. may be used as well.

Figure 2:
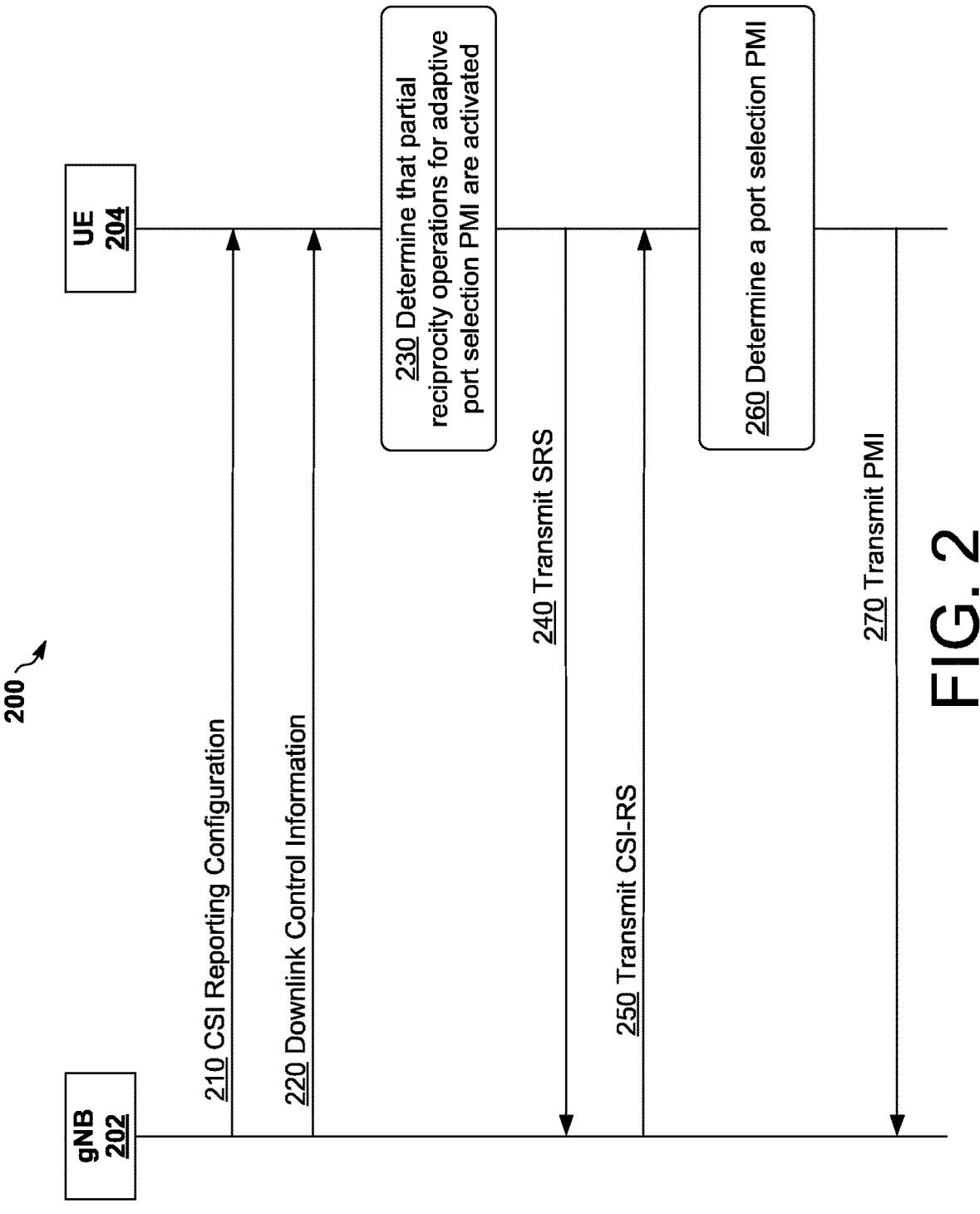
FIG. 2 illustrates a partial reciprocity-based adaptive port selection codebook configuration, according to an example implementation.

FIG. 2 illustrates a partial reciprocity-based adaptive port selection codebook configuration 200, according to an example implementation.

In an example implementation, at 210, a gNB, e.g., gNB 202, which may be same or similar to BS 134 of FIG. 1, may send a channel state information (CSI) reporting configuration at a UE, e.g., UE 204, which may be same or similar to user device 131 of FIG. 1. In some implementations, for example, the CSI reporting configuration may include a PMI as a reporting quantity and may also an adaptive port selection codebook configuration for the PMI. The codebook configuration may be generally described as an information element (IE) in RRC that may be used to configure the parameters of a PMI, including its type, for example, as defined in 3GPP TS 38.331. The CSI reporting configuration is in RRC and may indicate information required to generate a CSI report, including reporting quantities, their respective formats/configurations, downlink reference signal resources to be used for channel and interference measurements, etc.

In some implementations, for example, the gNB may send the CSI reporting configuration to the UE via radio resource control (RRC), e.g., RRC signaling, and may be of periodic, aperiodic, or semi-persistent type.

At 220 the gNB may send downlink control information (DCI) for scheduling uplink transmission. In an example implementation, the DCI may trigger an aperiodic CSI reporting via a CSI request field in the DCI. In an additional example implementation, the DCI may also trigger an aperiodic SRS transmission based on, for example, SRS request field in the DCI.

At 230, UE 202, upon receiving of the DCI at 220, may determine that partial reciprocity operations for adaptive port selection precoding matrix indicator are activated (or enabled). In an example implementation, the UE may determine that partial reciprocity operations for adaptive port selection precoding matrix indicator are activated based at least on information in an SRS request field of the DCI, an active semi-persistent SRS, or a periodic SRS configured by higher layers.

In an example implementation, the SRS request field in a DCI (also referred to as uplink grant DCI) may be 2 bits in length and may provide for four possible values as defined in 3GPP TS 38.212, Table 7.3.1.1.2-24.

At 240, UE 204 may generate and transmit an SRS to the gNB. In an example implementation, the transmission of the SRS may be triggered (or initiated) by the gNB for several reasons, e.g., uplink beam management, partial reciprocity-based port selection PMI reporting, etc. However, the triggered SRS transmission may not be suitable for partial reciprocity-based port selection. Therefore, in some implementations, for example, the inclusion of compatible SRS resource set IDs or SRS triggers in the proposed adaptive port selection codebook configuration may avoid scenarios where SRS-based partial reciprocity measurements may become unreliable (e.g., in other words, where triggered SRS is not optimized for partial reciprocity-based operations).

At 250, gNB 202 may transmit a downlink reference signal for channel and interference measurements. In an example implementation, gNB 202 may transmit a CSI-RS to the UE for channel and interference measurements.

At 260, the UE may determine a port selection PMI. In some implementations, the UE may determine the port selection PMI based at least on interpreting of the adaptive port selection codebook configuration.

In an example implementation, the interpreting of the adaptive port selection codebook configuration for the precoding matrix indicator may include determining dimensions of a precoder in spatial and/or frequency domains, time offset between SRS transmission and downlink reference signal measurements, a number of downlink reference signals ports to be measured, a number of quantization bits, and/or a maximum number of non-zero coefficients, or any combinations of them.

At 270, UE 204 may transmit a PMI to the gNB. In some implementations, for example, the UE may generate the PMI based at least on interpretation of the adaptive port selection codebook configuration and/or transmit the generated PMI to the gNB via, for example, uplink control information (UCI).

Thus, the partial reciprocity-based adaptive port selection codebook configuration and reporting described herein provides for reliable partial reciprocity-based operations.

Figure 3:
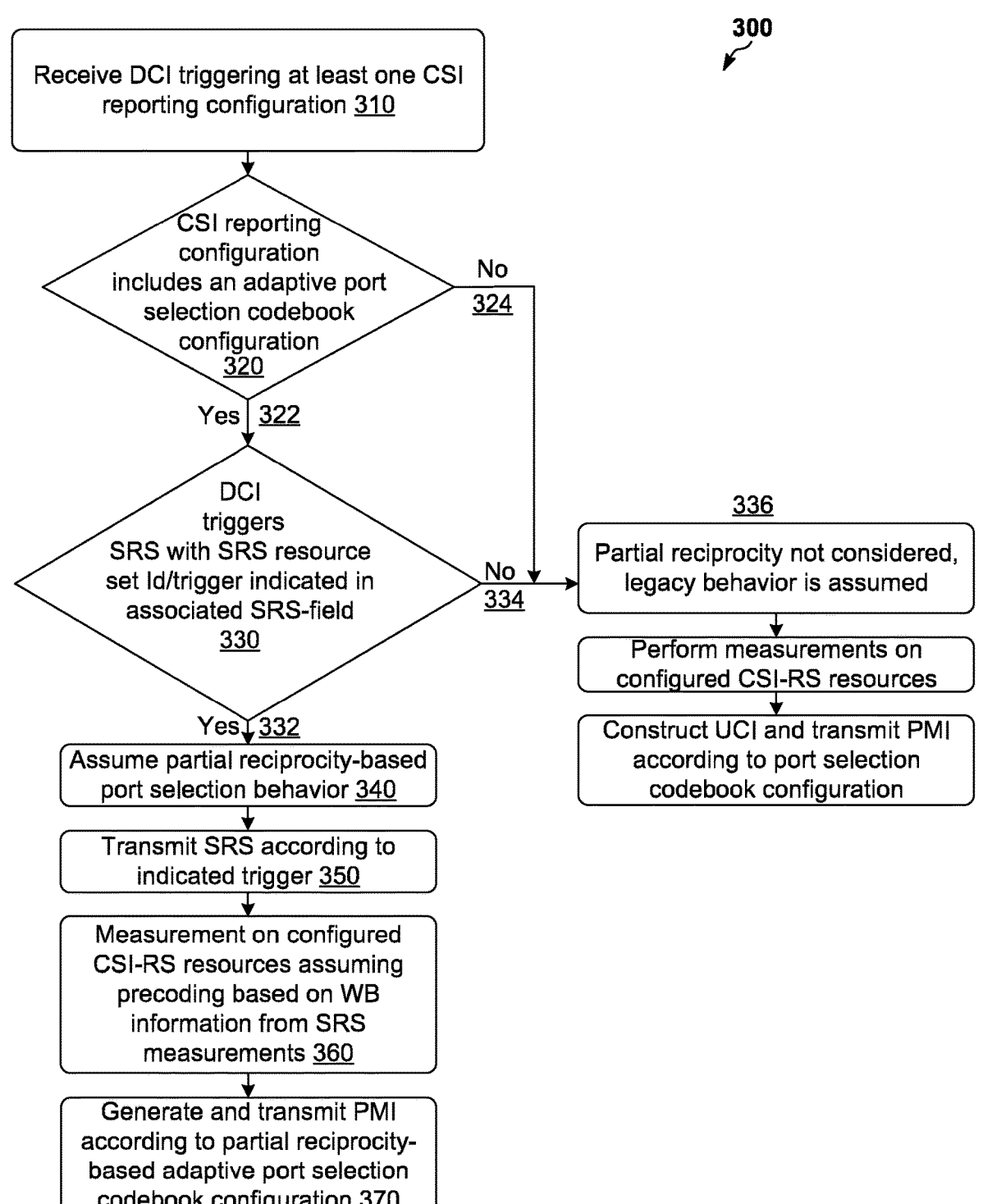
FIG. 3 illustrates a partial reciprocity-based adaptive port selection codebook configuration, according to an additional example implementation.

FIG. 3 illustrates a partial reciprocity-based adaptive port selection codebook configuration 300, according to an additional example implementation.

At 310, a UE, e.g., UE 204 of FIG. 2 may receive a downlink control information (DCI) from a gNB, e.g., gNB 204 of FIG. 2. In some implementations, for example, the DCI may trigger at least one CSI reporting configuration which may include PMI as a reporting quantity. In other words, the DCI may indicate a trigger state which may be associated with a number of CSI reporting configurations. The DCI may trigger the CSI reporting configuration that may be associated with the indicated trigger state.

At 320, the UE may determine whether the CSI reporting configuration triggered by the gNB, e.g., via DCI, includes an adaptive port selection codebook configuration for the PMI. In some implementations, for example, the adaptive port selection codebook configuration may include at least two codebook configurations (e.g., CodebookConfig), for example, a first codebook configuration and a second a codebook configuration. The first codebook configuration may include parameters for non-SRS-assisted adaptive port selection codebook configuration (e.g., legacy/current behavior) and/or the second codebook configuration may include parameters for an SRS-assisted adaptive port selection codebook configuration.

In an example implementation, a "CSI request" field of DCI may indicate which CSI report configuration is triggered and would be used to generate a port selection CSI report, depending on the codepoint in a "SRS request" field of the DCI. In other words, based on the CSI request field in the DCI, the UE may generate a port selection CSI report with only one of the codebook configurations, depending on a codepoint in the SRS request field.

In some implementations, for example, the adaptive port selection codebook configuration may be dynamically deactivated/activated the adaptive port selection codebook configuration.

At 332, the UE may trigger an SRS based on the SRS trigger codepoint indicated in the DCI., and the procedure 300 may continue to 340.

Alternately, in some implementations, for example, at 334, the UE may determine that the triggered SRS resource set/trigger is not indicated in the adaptive port selection codebook configuration, and the UE may assume that partial reciprocity-based operations are not active. The UE may proceed to 336 and may determine that partial reciprocity-based PMI reporting is not configured and may proceed with existing PMI reporting procedures which may include performing measurements on configured CSI-RS resources, constructing uplink control information (UCI), and/or transmitting PMI according to port selection codebook configuration, as defined in current 3GPP Specifications.

At 340, the UE may assume that partial reciprocity-based port selection operations are active.

At 350, the UE may transmit an SRS to the gNB. In some implementations, for example, the SRS may be based on the indicated SRS trigger codepoint in the SRS request field of the DCI.

At 360, the UE may perform measurements on configured CSI-RS resources assuming precoding based on wideband information from SRS measurements and active partial-reciprocity operations.

At 370, the UE may generate and transmit the PMI to the gNB. In some implementations, for example, the UE may generate the PMI based at least on interpreting of the adaptive port selection codebook configuration. In other words, the UE may generate the PMI based at least on interpreting that partial reciprocity-based adaptive port selection codebook configuration is activated. The PMI generated and transmitted at 370, when partial-reciprocity operations are active, may have a lower payload (e.g., when compared to legacy PMI) since the UE may not need to send all wideband information of the PMI to the gNB as the gNB may have already obtained such information from the SRS received from the UE. Such information may include the channel spatial and delay supports which characterize angle(s) and/or delay(s) of the channel paths. The gNB may use the obtained information from the received SRS in the precoding of downlink reference signals used by the UE to generate the PMI.

In an example implementation, the configuration of the PMI may indicate whether to drop or retain some portions (e.g., at least one portion relating to the channel wideband information) of the PMI.

In an example implementation, the interpreting of the adaptive port selection codebook configuration for the PMI may be based on one or more of determining dimensions of a precoder in spatial and/or frequency domains, time offset between SRS transmission and downlink reference signal measurements, a number of downlink reference signals ports to be measured, a number of quantization bits, and/or a maximum number of non-zero coefficients.

In an example implementation, the UE may transmit the PMI via uplink control information (UCI) which may be carried by a physical uplink control channel (PUCCH). construct an UCI and transmit PMI.

Thus, the partial reciprocity-based adaptive port selection codebook configuration and reporting described herein provides for reliable partial reciprocity-based operations.

Figure 4:
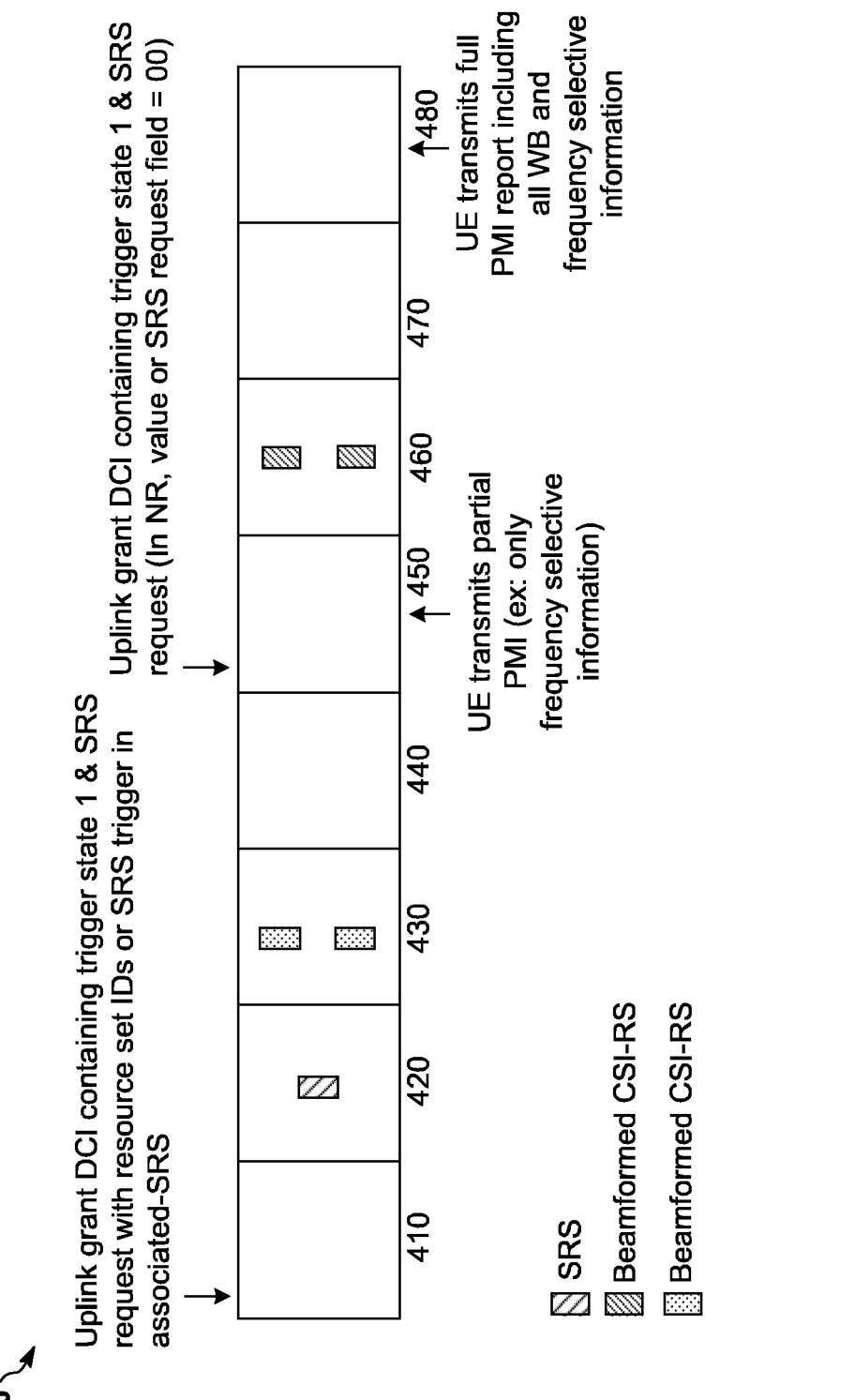
FIG. 4 illustrates a reciprocity-based CSI triggering mechanism, according to an example implementation.

FIG. 4 illustrates a reciprocity-based CSI triggering mechanism 400, according to an example implementation.

In an example implementation, as shown in FIG. 4, at 410, a UE, e.g., UE 204 of FIG. 2 may receive DCI including trigger state 1 and SRS request with resource sets IDs or SRS trigger in associated-SRS. In response, at 450, UE may transmit a partial PMI, for example, frequency selective information.

At 420, the SRS is transmitted from the UE to the gNB.

At 430, the transmission of a beamformed CSI-RS from the gNB is shown.

At 450, the UE may receive DCI containing trigger state 1 and without SRS request (e.g., SRS request field=00, for NR). In response, the UE may transmit a full PMI report including all WB and frequency selective information.

In other words, FIG. 4 illustrates operations according to the (e.g., at least) two interpretations of the adaptive port selection codebook configuration as described in the present disclosure, for example, from a perspective. In an example implementation, the assumption is that the same report may be triggered in both cases (trigger state 1). However, the difference between the two triggering instances is that the triggered SRS is not in associated-SRS. The different depictions of CSI-RS may refer to the fact that with partial-reciprocity based operations, the UE may measure only a subset of the transmitted resources since the gNB already obtained channel wideband information after receiving the SRS.

FIG. 5 is a flow chart 500 illustrating a partial reciprocity-based adaptive port selection codebook configuration, according to an example implementation.

In an example implementation, at block 510, a UE, e.g., UE 204 may receive at least one channel state information reporting configuration from a network node. In some implementations, for example, the at least one channel state information reporting configuration may include precoding matrix indicator as reporting quantity and an adaptive port selection codebook configuration for the precoding matrix indicator.

At block 520, the UE may determine whether partial reciprocity operations for adaptive port selection precoding matrix indicator are activated. In some implementations, for example, the determining may be based at least on information in a sounding reference signal (SRS) request field of a downlink control information, an active semi-persistent SRS, or a periodic SRS configured by higher layers.

At block 530, the UE may determine a port selection precoding matrix indicator based at least on interpreting of the adaptive port selection codebook configuration that the partial reciprocity operations are activated.

Optionally, in some implementations, for example, the UE may transmit a sounding reference signal and/or the precoding matrix indicator to the network node.

Thus, the partial reciprocity-based adaptive port selection codebook configuration and reporting described herein provides for reliable partial reciprocity-based operations.

FIG. 6 is a flow chart 600 illustrating a partial reciprocity-based adaptive port selection codebook configuration, according to an additional example implementation.

In an example implementation, at block 610, a gNB, e.g., gNB 202 may transmit at least one channel state information reporting configuration to a UE. In some implementations, for example, the channel state information reporting configuration may include an adaptive port selection codebook configuration and a sounding reference signal configuration to a user equipment.

In an example implementation, at block 620, a gNB, e.g., gNB 202 may receive a sounding reference signal and a precoding matrix indicator from the user equipment. In some implementations, for example, the sounding reference signal and the precoding matrix indicator may be generated by the user equipment based at least on the adaptive port selection codebook configuration and the sounding reference signal (SRS) request field of downlink control information, an active semi-persistent SRS, or a periodic SRS configured by higher layers.

Thus, the partial reciprocity-based adaptive port selection codebook configuration and reporting described herein provides for reliable partial reciprocity-based operations.

Additional example implementations are described herein.

Example 1. A method of communications, comprising: receiving, by a user equipment, at least one channel state information reporting configuration from a network node, the at least one channel state information reporting configuration including precoding matrix indicator as reporting quantity and an adaptive port selection codebook configuration for the precoding matrix indicator; determining, by the user equipment, whether partial reciprocity operations for adaptive port selection precoding matrix indicator are activated, the determining based at least on information in a sounding reference signal (SRS) request field of a downlink control information, an active semi-persistent SRS, or a periodic SRS configured by higher layers; and determining, by the user equipment, a port selection precoding matrix indicator based at least on interpreting of the adaptive port selection codebook configuration that the partial reciprocity operations are activated.

Example 2. The method of Example 1, further comprising: determining that partial reciprocity operations for the adaptive port selection precoding matrix indicator are deactivated; and determining the port selection precoding matrix indicator based at least on interpreting of the adaptive port selection codebook configuration that the partial reciprocity operations are deactivated.

Example 3. The method of any of Examples 1-2, further comprising: transmitting a sounding reference signal and/or the precoding matrix indicator, the precoding matrix indicator being determined based at least on interpreting of the adaptive port selection codebook configuration, to the network node.

Example 4. The method of any of Examples 1-3, wherein the adaptive port selection codebook configuration includes an additional field pointing to a plurality of SRS resource sets or SRS trigger codepoints for the partial reciprocity operations.

Example 5. The method of any of Examples 1-4, wherein the adaptive port selection codebook configuration includes an additional field indicating a number of downlink reference signals, ports and/or resources to be used when partial reciprocity operations are activated or deactivated.

Example 6. The method of any of Examples 1-5, wherein the adaptive port selection codebook configuration includes another additional field indicating a time offset between SRS transmission and downlink reference signal measurements when partial reciprocity operations are activated or deactivated.

Example 7. The method of any of Examples 1-6, wherein the precoding matrix indicator is computed based on interpretation of the adaptive port selection codebook configuration and included in uplink control information (UCI) and transmitted to the network node.

Example 8. The method of any of Examples 1-7, wherein the at least one channel state information reporting configuration, including the adaptive port selection codebook configuration for the precoding matrix indicator, is received via radio resource control (RRC), and wherein the configuration is of a periodic, aperiodic, or a semi-persistent reporting type.

Example 9. The method of any of Examples 1-8, wherein the adaptive port selection codebook configuration includes a single codebook configuration interpreted differently depending on the information in the SRS request field in downlink control information, active semi-persistent SRS, or configured periodic SRS by higher layers, and on the indicated SRS resource sets in the adaptive port selection codebook configuration.

Example 10. The method of any of Examples 1-9, wherein the adaptive port selection codebook configuration includes at least a first codebook configuration and a second codebook configuration.

Example 11. The method of any of Examples 1-10, wherein the first codebook configuration is an SRS-assisted port selection codebook configuration and the second codebook configuration is a non-SRS-assisted port selection codebook configuration.

Example 12. The method of any of Examples 1-11, wherein the first codebook configuration or the second codebook configuration is activated depending on information in a SRS request field in downlink control information, active semi-persistent SRS, or configured periodic SRS by higher layers, and on indicated SRS resource sets or SRS request codepoints in the adaptive port selection codebook configuration.

Example 13. The method of any of Examples 1-12, wherein the interpreting of the adaptive port selection codebook configuration for the precoding matrix indicator includes determining dimensions of a precoder in spatial and/or frequency domains, time offset between SRS transmission and downlink reference signal measurements, a number of downlink reference signals ports to be measured, a number of quantization bits, and/or a maximum number of non-zero coefficients, or a combinations thereof.

Example 14. The method of any of Examples 1-13, wherein the adaptive port selection codebook configuration includes another field indicating configuration of the precoding matrix indicator when partial reciprocity operations are activated.

Example 15. The method of any of claims 1-13, wherein the adaptive port selection codebook configuration includes another field indicating configuration of the precoding matrix indicator when partial reciprocity operations are deactivated.

Example 16. The method of any of Examples 1-15, wherein the configuration of the precoding matrix indicator indicates one or more portions of the precoding matrix indicator to drop or retain, depending on interpretation.

Example 17. The method of any of Examples 1-16, wherein the adaptive port selection codebook configuration includes an additional field pointing to a plurality of SRS resource sets or SRS trigger codepoints for the partial reciprocity operations.

Example 18. The method of any of Examples 1-17, wherein the SRS resource sets suitable for partial reciprocity-based port selection PMI reporting are determined based at least on a number of ports, a frequency domain density, and/or power level.

Example 19. The method of any of Examples 1-18, further comprising: activating or deactivating the interpretation of the adaptive port selection codebook configuration via dynamic downlink signaling.

Example 20. The method of any of Examples 1-19, wherein the dynamic downlink signaling includes downlink control information (DCI) or media access control control element (MAC CE).

Example 21. A method of communications, comprising: transmitting, by a network node, at least one channel state information reporting configuration comprising an adaptive port selection codebook configuration and a sounding reference signal configuration to a user equipment; and receiving, by the network node, a sounding reference signal and a precoding matrix indicator from the user equipment, the sounding reference signal and the precoding matrix indicator generated by the user equipment based at least on the adaptive port selection codebook configuration and the sounding reference signal (SRS) request field of downlink control information, an active semi-persistent SRS, or a periodic SRS configured by higher layers.

Example 22. The method of Example 21, further comprising: determining spatial support and frequency domain components spanning channel taps based at least on the sounding reference signal received from the user equipment.

Example 23. The method of any of Examples 21-22, wherein the adaptive port selection codebook configuration includes at least a first codebook configuration and a second codebook configuration, and wherein the first codebook configuration is an SRS-assisted port selection codebook configuration and the second codebook configuration is a non-SRS-assisted port selection codebook configuration.

Example 24. The method of any of Examples 21-23, further comprising: activating or deactivating interpretation of the adaptive port selection codebook configuration via dynamic downlink signaling, the dynamic downlink signaling including downlink control information (DCI) or media access control control element (MAC CE).

Example 25. The method of any of Examples 1-24, wherein the network node is a serving cell or a gNB.

Example 26. An apparatus comprising means for performing the method of any of Examples 1-25.

Example 27. A non-transitory computer-readable storage medium comprising instructions stored thereon that, when executed by at least one processor, are configured to cause a computing system to perform the method of any of Examples 1-25.

Example 28. An apparatus comprising: at least one processor; and at least one memory including computer program code, the at least one memory and the computer program code configured to, with the at least one processor, cause the apparatus at least to perform the method of any of Examples 1-25.

Figure 7:
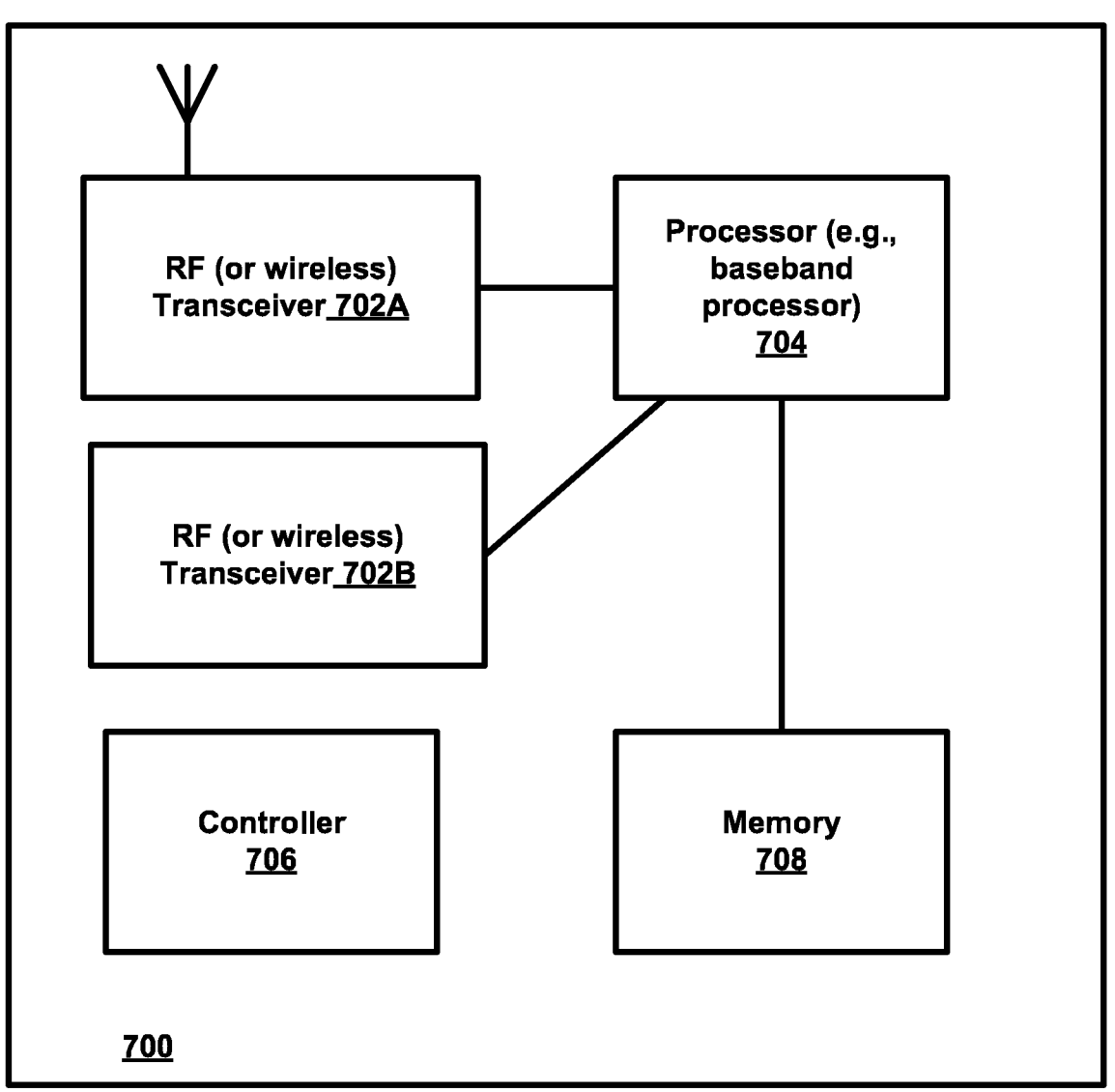
FIG. 7 is a block diagram of a node or wireless station (e.g., base station/access point or mobile station/user device/UE), according to an example implementation.

FIG. 7 is a block diagram of a wireless station (e.g., user equipment (UE)/user device or AP/gNB/MgNB/SgNB) 700 according to an example implementation. The wireless station 700 may include, for example, one or more RF (radio frequency) or wireless transceivers 702A, 702B, where each wireless transceiver includes a transmitter to transmit signals and a receiver to receive signals. The wireless station also includes a processor or control unit/entity (controller) 704/706 to execute instructions or software and control transmission and receptions of signals, and a memory 708 to store data and/or instructions.

Processor 704 may also make decisions or determinations, generate frames, packets or messages for transmission, decode received frames or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller 706 (or processor 704) may execute software and instructions, and may provide overall control for the station 700, and may provide control for other systems not shown in FIG. 7, such as controlling input/output devices (e.g., display, keypad), and/or may execute software for one or more applications that may be provided on wireless station 700, such as, for example, an email program, audio/video applications, a word processor, a Voice over IP application, or other application or software. Moreover, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. A method of communications, comprising:

receiving, with a user equipment, at least one channel state information reporting configuration from a network node, the at least one channel state information reporting configuration including precoding matrix indicator as reporting quantity and an adaptive port selection codebook configuration for the precoding matrix indicator, wherein the adaptive port selection codebook configuration includes an additional field indicating a number of downlink reference signals, ports and resources to be used when partial reciprocity operations are activated or deactivated;

determining, with the user equipment, whether partial reciprocity operations for adaptive port selection precoding matrix indicator are activated, the determining based at least on information in a sounding reference signal request field of a downlink control information, an active semi-persistent sounding reference signal, or a periodic sounding reference signal configured by higher layers; and determining, with the user equipment, a port selection precoding matrix indicator based at least on interpreting of the adaptive port selection codebook configuration that the partial reciprocity operations are activated, wherein the interpreting of the adaptive port selection codebook configuration for the precoding matrix indicator includes determining dimensions of a precoder in spatial and frequency domains, time offset between sounding reference signal transmission and downlink reference signal measurements, a number of downlink reference signals ports to be measured, a number of quantization bits, and a maximum number of non-zero coefficients, the method further comprising:

transmitting a sounding reference signal and the precoding matrix indicator, the precoding matrix indicator being determined based at least on interpreting of the adaptive port selection codebook configuration, to the network node, wherein the sounding reference signal resource sets suitable for partial reciprocity-based port selection precoding matrix indicator reporting are determined based at least on a number of ports, a frequency domain density, and power level.

2. The method of claim 1, further comprising:

determining that partial reciprocity operations for the adaptive port selection precoding matrix indicator are deactivated; and determining the port selection precoding matrix indicator based at least on interpreting of the adaptive port selection codebook configuration that the partial reciprocity operations are deactivated.

3. The method of claim 1, wherein the adaptive port selection codebook configuration includes an additional field pointing to a plurality of sounding reference signal resource sets or sounding reference signal trigger codepoints for the partial reciprocity operations, wherein the adaptive port selection codebook configuration includes another additional field indicating a time offset between sounding reference signal transmission and downlink reference signal measurements when partial reciprocity operations are activated or deactivated.

4. The method of claim 1, wherein the precoding matrix indicator is computed based on interpretation of the adaptive port selection codebook configuration and included in uplink control information and transmitted to the network node.

5. The method of claim 1, wherein the at least one channel state information reporting configuration, including the adaptive port selection codebook configuration for the precoding matrix indicator, is received via radio resource control, and wherein the configuration is of a periodic, aperiodic, or a semi-persistent reporting type.

6. The method of any of claim 1, wherein the adaptive port selection codebook configuration includes a single codebook configuration interpreted differently depending on the information in the sounding reference signal request field in downlink control information, active semi-persistent sounding reference signal, or configured periodic sounding reference signal by higher layers, and on the indicated sounding reference signal resource sets in the adaptive port selection codebook configuration.

7. The method of claim 1, wherein the adaptive port selection codebook configuration includes at least a first codebook configuration and a second codebook configuration, wherein the first codebook configuration is a sounding reference signal assisted port selection codebook configuration and the second codebook configuration is a sounding reference signal non-assisted port selection codebook configuration, wherein the first codebook configuration or the second codebook configuration is activated depending on information in a sounding reference signal request field in downlink control information, active semi-persistent sounding reference signal, or configured periodic sounding reference signal by higher layers, and on indicated sounding reference signal resource sets or sounding reference signal request codepoints in the adaptive port selection codebook configuration.

8. The method of claim 1, wherein the adaptive port selection codebook configuration includes another field indicating configuration of the precoding matrix indicator when partial reciprocity operations are activated, wherein the adaptive port selection codebook configuration includes another field indicating configuration of the precoding matrix indicator when partial reciprocity operations are deactivated.

9. The method of claim 1, wherein the configuration of the precoding matrix indicator indicates one or more portions of the precoding matrix indicator to drop or retain, depending on interpretation.

10. The method of claim 1, wherein the adaptive port selection codebook configuration includes an additional field pointing to a plurality of sounding reference signal resource sets or sounding reference signal trigger codepoints for the partial reciprocity operations.

11. The method of claim 1, further comprising:

activating or deactivating the interpretation of the adaptive port selection codebook configuration via dynamic downlink signaling.

12. The method of claim 1, wherein the dynamic downlink signaling includes downlink control information or media access control control element (MAC CE).

13. A user equipment comprising:

at least one processor; and at least one memory including computer program code;

the at least one memory and the computer program code configured to, with the at least one processor, cause the user equipment at least to perform:

receiving at least one channel state information reporting configuration from a network node, the at least one channel state information reporting configuration including precoding matrix indicator as reporting quantity and an adaptive port selection codebook configuration for the precoding matrix indicator, wherein the adaptive port selection codebook configuration includes an additional field indicating a number of downlink reference signals, ports and resources to be used when partial reciprocity operations are activated or deactivated;

determining whether partial reciprocity operations for adaptive port selection precoding matrix indicator are activated, the determining based at least on information in a sounding reference signal request field of a downlink control information, an active semi-persistent sounding reference signal, or a periodic sounding reference signal configured by higher layers; and determining a port selection precoding matrix indicator based at least on interpreting of the adaptive port selection codebook configuration that the partial reciprocity operations are activated, wherein the interpreting of the adaptive port selection codebook configuration for the precoding matrix indicator includes determining dimensions of a precoder in spatial and frequency domains, time offset between sounding reference signal transmission and downlink reference signal measurements, a number of downlink reference signals ports to be measured, a number of quantization bits, and a maximum number of non-zero coefficients, the at least one memory and the computer program code further configured to, with the at least one processor, cause the user equipment at least to perform:

transmitting a sounding reference signal and the precoding matrix indicator, the precoding matrix indicator being determined based at least on interpreting of the adaptive port selection codebook configuration, to the network node, wherein the sounding reference signal resource sets suitable for partial reciprocity-based port selection precoding matrix indicator reporting are determined based at least on a number of ports, a frequency domain density, and power level.

14. The user equipment of claim 13, wherein the at least one memory and the computer program code further configured to, with the at least one processor, cause the user equipment at least to perform:

activating or deactivating interpretation of the adaptive port selection codebook configuration based on dynamic downlink signaling comprising downlink control information (DCI) or a media access control control element (MAC CE).

15. The user equipment of claim 13, wherein when a sounding reference signal request triggers aperiodic sounding reference signal transmission with a resource set not included in an associated-SRS field of the adaptive port selection codebook configuration, the at least one memory and the computer program code are further configured to, with the at least one processor, cause the user equipment at least to perform:

determining that partial reciprocity operations are not active and assumes Rel-15 or Rel-16 port selection without partial reciprocity-based operations.

16. The user equipment of claim 13, wherein the adaptive port selection codebook configuration includes a first codebook configuration for non-SRS-assisted port selection and a second codebook configuration for SRS-assisted port selection, and wherein the at least one memory and the computer program code are further configured to, with the at least one processor, cause the user equipment at least to perform:

generating a port selection report with one of the configurations depending on a codepoint in an SRS request field of downlink control information.

17. The user equipment of claim 13, wherein when partial reciprocity operations are activated, the at least one memory and the computer program code are further configured to, with the at least one processor, cause the user equipment at least to perform:

generating and transmitting a partial precoding matrix indicator report having reduced payload relative to a full precoding matrix indicator report.

18. The user equipment of claim 13, wherein the configuration of the precoding matrix indicator indicates one or more portions of the precoding matrix indicator to drop or retain, including at least a portion relating to channel wideband information.

19. The user equipment of claim 13, wherein when partial reciprocity operations are active, the at least one memory and the computer program code are further configured to, with the at least one processor, cause the user equipment at least to perform:

measuring configured channel state information reference signal resources assuming precoding based on wideband information from sounding reference signal measurements and active partial-reciprocity operations.

* * * * *